United States Patent
Miller

(10) Patent No.: US 11,478,997 B2
(45) Date of Patent: Oct. 25, 2022

(54) AUTOMATED FIBER PLACEMENT SYSTEM AND ASSOCIATED METHOD

(71) Applicant: The Boeing Company, Chicago, IL (US)

(72) Inventor: Richard A. Miller, Seattle, WA (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 16/569,537

(22) Filed: Sep. 12, 2019

(65) Prior Publication Data

US 2021/0078265 A1 Mar. 18, 2021

(51) Int. Cl.
*B29C 70/38* (2006.01)
*B29C 53/80* (2006.01)

(52) U.S. Cl.
CPC ........ *B29C 70/382* (2013.01); *B29C 53/8016* (2013.01); *B29C 70/386* (2013.01); *B29C 2053/8025* (2013.01)

(58) Field of Classification Search
CPC .............. B29C 70/382; B29C 53/8016; B29C 2053/8025; B29C 70/386; B29C 70/56; B29C 70/384; B29C 70/38
USPC ................................ 264/242, 553, 258, 40.1
See application file for complete search history.

(56) References Cited

U.S. PATENT DOCUMENTS

| | | | | |
|---|---|---|---|---|
| 4,907,754 A | * | 3/1990 | Vaniglia | B29C 53/66 156/425 |
| 5,503,928 A | * | 4/1996 | Cheshire | B29C 53/8066 428/357 |
| 2008/0169579 A1 | * | 7/2008 | Mueller-Hummel | B29C 70/386 264/40.1 |
| 2012/0138232 A1 | * | 6/2012 | Kisch | B29C 70/384 156/433 |

FOREIGN PATENT DOCUMENTS

WO WO-2016198755 A1 * 12/2016 ........... B65H 59/387

* cited by examiner

*Primary Examiner* — Jacob T Minskey
*Assistant Examiner* — S. Behrooz Ghorishi
(74) *Attorney, Agent, or Firm* — Kunzler Bean & Adamson

(57) ABSTRACT

Disclosed herein is an automated fiber placement system that comprises a robot, an end effector, and a creel assembly that is coupled to the robot and movable with the robot. The creel assembly comprises a spool of a tow and a tow tensioner. The tow tensioner comprises an arm assembly that is pivotable toward and away from a tow direction between a forward position and a rearward position, inclusive, and configured to secure the tow from the spool as the tow unwinds from the spool and moves in the tow direction. The tow tensioner also comprises a biasing member that is coupled to the arm assembly and configured to bias the arm assembly into a neutral position between the forward position and the rearward position. The tow tensioner additionally comprises a potentiometer that is coupled to the arm assembly and configured to detect a position of the arm assembly.

20 Claims, 7 Drawing Sheets

AUTOMATED FIBER PLACEMENT SYSTEM AND ASSOCIATED METHOD

FIELD

This disclosure relates generally to automated fiber placement systems, and more particularly to controlling tension in tows applied to a surface using an automated fiber placement system.

BACKGROUND

Automated fiber placement systems are designed to apply tows of fibrous material onto a surface for the purpose of forming fiber reinforced composite parts. Generally, automated fiber placement systems include a robot that applies the tows of material to the surface in an automated manner. Under certain circumstances, the tows are prone to contacting the robot, which can increase the potential for contamination or foreign object debris to accumulate on the tows. For example, rapid and expansive movement of an end effector relative to the robot, such as to apply tows onto contoured surfaces, may cause a significant loss in tension in the tows, thus resulting in the tows drooping into contact with the robot. Additionally, rapid and expansive movement of the end effector relative to the robot may cause a significant increase in tension in the tows, thus increasing the potential for deformation or breakage of the tows. Maintaining tension in the tows to within a desired range generally ensures consistent quality of the tows as the end effector applies the tows onto the surface. However, high-quality control of the tension in tows, as the tows are applied onto a contoured or otherwise complex surface to fabricate high-performance aerospace parts using an automated robot, can be difficult.

SUMMARY

The subject matter of the present application provides examples of an automated fiber placement system and corresponding method for delivering a material to a surface that overcome the above-discussed shortcomings of prior art techniques. Accordingly, the subject matter of the present application has been developed in response to the present state of the art, and in particular, in response to shortcomings of conventional automated fiber placement systems for forming composite or other parts.

Disclosed herein is an automated fiber placement system for forming a part. The automated fiber placement system comprises a robot and an end effector. The end effector is coupled to the robot such that the end effector is movable relative to the robot. The automated fiber placement system further comprises a creel assembly that is coupled to the robot and movable with the robot. The creel assembly comprises a spool of a tow and a tow tensioner. The tow tensioner comprises an arm assembly that is pivotable toward and away from a tow direction between a forward position and a rearward position, inclusive, and configured to secure the tow from the spool as the tow unwinds from the spool and moves in the tow direction. The tow tensioner also comprises a biasing member that is coupled to the arm assembly and configured to bias the arm assembly into a neutral position between the forward position and the rearward position. The tow tensioner additionally comprises a potentiometer that is coupled to the arm assembly and configured to detect a position of the arm assembly. The preceding subject matter of this paragraph characterizes example 1 of the present disclosure.

The creel assembly further comprises a motor that is coupled to the spool and is selectively operable to rotate the spool in a first rotational direction, to unwind the tow from the spool, and a second rotational direction that is opposite the first rotational direction, to wind the tow onto the spool. The tow tensioner further comprises a controller that is coupled to the potentiometer to receive arm-position input from the potentiometer and coupled to the motor to control rotation of the spool in either the first rotational direction or the second rotational direction in response to the arm-position input. The preceding subject matter of this paragraph characterizes example 2 of the present disclosure, wherein example 2 also includes the subject matter according to example 1, above.

The arm-position input from the potentiometer indicates the arm assembly is in one of a forward-of-neutral position, the neutral position, or a rearward-of-neutral position. The controller controls rotation of the spool by rotating the spool in the second rotational direction when the arm-position input indicates the arm assembly is in the forward-of-neutral position, rotating the spool in the first rotational direction when the arm-position input indicates the arm assembly is in the rearward-of-neutral position, and not rotating the spool when the arm-position input indicates the arm assembly is in the neutral position. The preceding subject matter of this paragraph characterizes example 3 of the present disclosure, wherein example 3 also includes the subject matter according to example 2, above.

The controller rotates the spool in the second rotational direction an amount proportional to a distance between the forward-of-neutral position and the neutral position. The controller rotates the spool in the first rotational direction an amount proportional to a distance between the rearward-of-neutral position and the neutral position. The preceding subject matter of this paragraph characterizes example 4 of the present disclosure, wherein example 4 also includes the subject matter according to example 3, above.

The controller controls rotation of the spool to maintain a change of tension in the tow to within +/−0.25 pound-force (lbf). The preceding subject matter of this paragraph characterizes example 5 of the present disclosure, wherein example 5 also includes the subject matter according to any one of examples 3-4, above.

The controller controls rotation of the spool to maintain a change in tension in the tow to within +/−0.10 pound-force (lbf). The preceding subject matter of this paragraph characterizes example 6 of the present disclosure, wherein example 6 also includes the subject matter according to example 5, above.

The creel assembly further comprises a plurality of tows. The creel assembly also comprises a plurality of spools, each comprising a corresponding tow of the plurality of tows. The creel assembly additionally comprises a plurality of motors, each coupled to a corresponding spool of the plurality of spools and each selectively operable to rotate the corresponding spool in the first rotational direction, to unwind the corresponding tow of the plurality of tows from the corresponding spool, and the second rotational direction, to wind the corresponding tow onto the corresponding spool. The tow tensioner further comprises a plurality of arm assemblies, each independently pivotable relative to any other arm assembly of the plurality of arm assemblies and each configured to secure a corresponding tow of the plurality of tows as the corresponding tow moves in the tow direction. The tow tensioner also comprises a plurality of biasing members, each coupled to a corresponding arm assembly of the plurality of arm assemblies. The tow tensioner additionally comprises a plurality of potentiometers, each coupled to a corresponding arm assembly of the plurality of arm assemblies. The controller is coupled to the plurality of potentiometers to receive arm-position input from each of the plurality of potentiometers. The controller is also coupled to the plurality of motors to control rotation of each one of the plurality of spools independently of any other one of the plurality of spools. The controller controls rotation of a corresponding spool of the plurality of spools in either the first rotational direction or the second rotational direction in response to the arm-position input received from the potentiometer of the plurality of potentiometers coupled to the arm assembly to which the tow of the corresponding spool is secured. The preceding subject matter of this paragraph characterizes example 7 of the present disclosure, wherein example 7 also includes the subject matter according to any one of examples 2-6, above.

The biasing member is selectively adjustable to adjust a bias of the biasing member. The preceding subject matter of this paragraph characterizes example 8 of the present disclosure, wherein example 8 also includes the subject matter according to any one of examples 1-7, above.

The arm assembly comprises an arm, pivotable toward and away from the tow direction between the forward position and the rearward position, inclusive. The arm assembly further comprises a wheel, rotatably coupled to the arm. The wheel comprises a circumferential groove, extending about an outer periphery of the wheel and configured to receive and retain the tow as the tow moves in the tow direction. The preceding subject matter of this paragraph characterizes example 9 of the present disclosure, wherein example 9 also includes the subject matter according to any one of examples 1-8, above.

The tow tensioner further comprises a base and a tow guide. The tow guide is fixed to the base and comprises a tow aperture configured to receive and retain the tow as the tow moves in the tow direction away from the arm assembly. The spool is movably fixed to the base. The tow tensioner is movably fixed to the base and is interposed between the spool and the tow guide. The tow guide is spaced apart from the tow tensioner in the tow direction. The preceding subject matter of this paragraph characterizes example 10 of the present disclosure, wherein example 10 also includes the subject matter according to any one of examples 1-9, above.

The robot comprises a support arm that is pivotable relative to the part. The end effector is pivotable and rotatable relative to the support arm. The creel assembly is fixed to the support arm of the robot. The preceding subject matter of this paragraph characterizes example 11 of the present disclosure, wherein example 11 also includes the subject matter according to any one of examples 1-10, above.

Further disclosed herein is a method of delivering a material to a surface. The method comprises extending a tow from a spool to an arm assembly of a tow tensioner. The method also comprises feeding the tow from the arm assembly to an end effector, coupled to a robot, in a tow direction. The method further comprises applying the tow onto the surface with the end effector. The method additionally comprises pivoting the arm assembly toward and away from the tow direction, between a forward position and a rearward position, inclusive, in response to a change in tension of the tow. The method also comprises detecting a position of the arm assembly in one of a forward-of-neutral position or a rearward-of-neutral position. The method further comprises unwinding the tow from the spool in response to detection of the arm assembly in the forward-of-neutral position until the arm assembly is in a neutral position, between the forward position and the rearward position. The method additionally comprises winding the tow onto the spool in response to detection of the arm assembly in the rearward-of-neutral position until the arm assembly is in the neutral position. The preceding subject matter of this paragraph characterizes example 12 of the present disclosure.

The method further comprises biasing the arm assembly away from the forward position toward the rearward position. The preceding subject matter of this paragraph characterizes example 13 of the present disclosure, wherein example 13 also includes the subject matter according to example 12, above.

The tow is unwound from the spool and the tow is wound onto the spool to maintain the change of tension in the tow to within +/−0.25 pound-force (lbf). The preceding subject matter of this paragraph characterizes example 14 of the present disclosure, wherein example 14 also includes the subject matter according to any one of examples 12-13, above.

The method further comprises retaining the tow within a circumferential groove of a wheel of the arm assembly as the arm assembly pivots toward and away from the tow direction. The preceding subject matter of this paragraph characterizes example 15 of the present disclosure, wherein example 15 also includes the subject matter according to any one of examples 12-14, above.

The method further comprises extending tows each to a corresponding arm assembly of a plurality of arm assemblies. The method also comprises feeding each one of the tows from the corresponding arm assembly to the end effector in the tow direction. The method additionally comprises applying the tows onto the surface with the end effector. The method further comprises pivoting any arm assembly of the arm assemblies, independently of any other arm assembly of the arm assemblies, toward and away from the tow direction, between the forward position and the rearward position, inclusive, in response to a change in tension of the tow corresponding with the any arm assembly. The method also comprises detecting a position of the arm assemblies in one of the forward-of-neutral position or the rearward-of-neutral position. The method additionally comprises unwinding any tow of the tows from a corresponding spool of the spools, independently of any other tow of the tows, in response to detection of the arm assembly, corresponding with the any tow, in the forward-of-neutral position until the arm assembly, corresponding with the any tow, is in the neutral position. The method also comprises winding any tow of the tows onto a corresponding spool of the spools, independently of any other tow of the tows, in response to detection of the arm assembly, corresponding with the any tow, in the rearward-of-neutral position until the arm assembly, corresponding with the any tow, is in the neutral position. The preceding subject matter of this paragraph characterizes example 16 of the present disclosure, wherein example 16 also includes the subject matter according to any one of examples 12-15, above.

Additionally disclosed herein is a tow tensioner for a creel assembly of an automated fiber placement system. The tow tensioner comprises an arm assembly that is pivotable toward and away from a tow direction between a forward position and a rearward position, inclusive, and configured to secure a tow as the tow moves in the tow direction. The tow tensioner also comprises a biasing member that is coupled to the arm assembly and configured to bias the arm assembly into a neutral position between the forward position and the rearward position. The tow tensioner further comprises a potentiometer that is coupled to the arm assembly and configured to detect a position of the arm assembly. The preceding subject matter of this paragraph characterizes example 17 of the present disclosure.

The tow tensioner further comprises a plurality of arm assemblies, each independently pivotable relative to any other arm assembly of the plurality of arm assemblies and each configured to secure a corresponding tow of a plurality of tows as the corresponding tow moves in the tow direction. The tow tensioner also comprises a plurality of biasing members, each coupled to a corresponding arm assembly of the plurality of arm assemblies. The tow tensioner additionally comprises a plurality of potentiometers, each coupled to a corresponding arm assembly of the plurality of arm assemblies. The preceding subject matter of this paragraph characterizes example 18 of the present disclosure, wherein example 18 also includes the subject matter according to example 17, above.

The tow tensioner further comprises a base having a first side and a second side that is opposite the first side. The plurality of arm assemblies are pivotably coupled to the base. The plurality of arm assemblies comprise a first set of arm assemblies that are pivotable about a first axis and a second set of arm assemblies that are pivotable about a second axis. The first set of arm assemblies are fixed to the first side of the base. The second set of arm assemblies are fixed to the second side of the base and mirror the first set of arm assemblies. The preceding subject matter of this paragraph characterizes example 19 of the present disclosure, wherein example 19 also includes the subject matter according to example 18, above.

The tow tensioner further comprises a tow guide that is spaced apart from the arm assembly and comprising a tow aperture configured to receive and retain the tow as the tow moves in the tow direction away from the arm assembly. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a system that comprises a robot and an end effector movably controlled by the robot to deliver material to a surface. The material supply is on-board the robot at a location away from the end effector. Accordingly, the end effector moves independently of the material supply. The material supply is stored on a creel assembly that includes a tow tensioner. The tow tensioner maintains tension in the material as it is delivered to the end effector and as the end effector moves relative to the material supply to deliver material to the surface. In some examples, the tow tensioner maintains tension in the material automatically using a closed-loop control system by actively and selectively unwinding (e.g., despooling) material from spools or winding (e.g., respooling) material back onto spools as needed. Maintaining tension in the material helps to avoid deformation of the material (e.g., pringling, roping, buckling, tangling, and/or breaking of the material), as the end effector applies the material onto the surface, which can lead to uneven layups, stresses, or gaps in the material applied onto the surface.

In some examples, the system disclosed herein is used to fabricate a composite part using either dry fiber material or pre-impregnated fiber material tows. More specifically, in certain examples, the composite part is a fiber-reinforced composite part and the tows are made of a carbon fiber material. The system helps to fabricate high-performance parts, such as those conducive to aerospace applications, with reliable, predictable, and consistent placement of fibers, without deformation, wrinkling, or buckling of the fibers, at desired orientations. Accordingly, the system provides high-quality control of the tension of the tows as the tows are used to fabricate high-performance parts.

Figure 1:
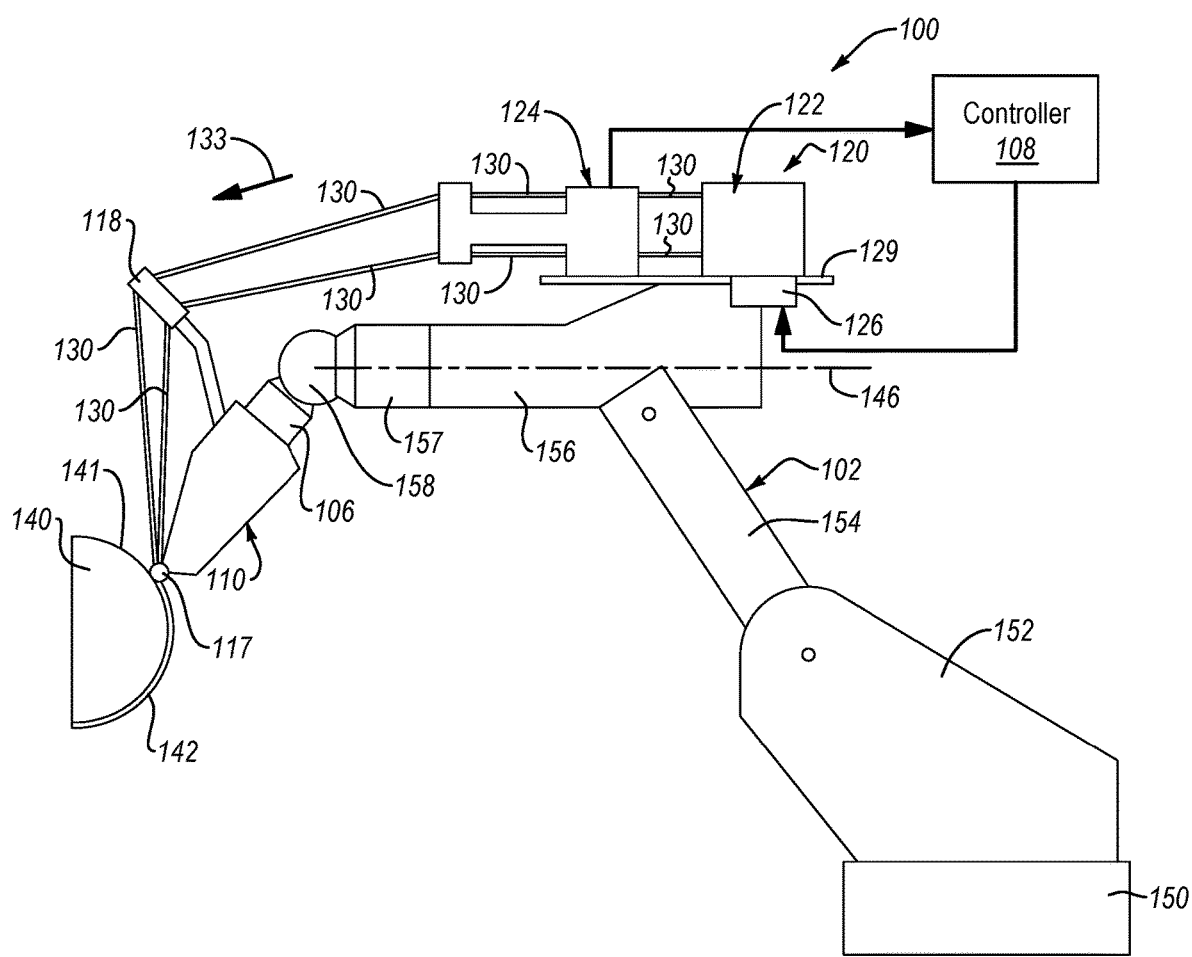
FIG. 1 is a schematic side view of an automated fiber placement system for forming a part, according to one or more examples of the present disclosure.

Referring to FIG. 1, according to some examples, disclosed herein is an automated fiber placement system 100 for delivering material onto a surface 141. In the illustrated examples, the material delivered onto the surface 141 includes one or more tows 130 of material. The automated fiber placement system 100 includes a robot 102, an end effector 110 coupled to the robot 102, and a creel assembly 120 coupled to the robot 102. The end effector 110 is movable by the robot 102, relative to the robot 102, to deliver the tows 130 onto the surface 141. The creel assembly 120 is fixed to the robot 102 and movable with the robot 102. Accordingly, end effector 110 is movable relative to the creel assembly 120 and the creel assembly 120 is co-movably fixed to the robot 102.

The robot 102 includes multiple articulating members. In the illustrated examples, the robot 102 includes a footing 150 and a base 152 that is rotatable relative to the footing 150 about a vertical axis. The robot 102 further includes a connecting arm 154 that is pivotable relative to the base 152 about a horizontal axis. The robot 102 additionally includes a support arm 156 or supplemental arm that is pivotable relative to the connecting arm 154 about a horizontal axis. The support arm 156 defines a support axis 146 that extends along a length of the support arm 156. The robot 102 further includes an end-effector extension arm 157 that is rotatable relative to the support arm 156 about the support axis 146. The robot 102 also includes an end-effector coupler arm 158 that is pivotable relative to the end-effector extension arm 157 about an axis, perpendicular to the support axis 146 of the support arm 156. The robot 102 further includes an end-effector interface arm 106 that is rotatable about an axis, perpendicular to the axis about which the end-effector coupler arm 158 rotates. The end effector 110 is coupled directly to the end-effector interface arm 106 and is co-movably fixed relative to the end-effector interface arm 106. Accordingly, in some examples, the robot 102 is a 6-axis robot that facilitates motion of the end effector 110 with 6-degrees of freedom. However, in other examples, the robot 102 can have fewer or more than 6-degrees of freedom.

The creel assembly 120, in the illustrated examples, is fixed to the support arm 156 such that the creel assembly 120 moves with the support arm 156 as the support arm 156 moves. Because the end effector 110 is movable relative to the support arm 156, then the end effector 110 is movable relative to the creel assembly 120. The creel assembly 120 may be fixed to a top of the support arm 156 using any of various fixation methods, such as using fasteners, brackets, etc. Fixing the creel assembly 120 to the support arm 156, and more specifically the top of the support arm 156, provides clearance for tows 130 to be fed from the creel assembly 120 to the end effector 110 as the end effector 110 moves relative to the surface 141.

Each tow 130 is made of any various materials that can be applied onto the surface 141. In certain examples, each tow 130 is a material tape that is spoolable about a spool 160 of the creel assembly 120. The tow 130 includes fibers, such as carbon fibers, glass fibers, and/or metal fibers, in some examples. The fibers can be unidirectional or can be interwoven to form the tow 130. For example, the tow 130 may be a metal matrix tape that comprises metal fibers (e.g., aluminum fibers) interwoven with non-metal fibers (e.g., glass fibers). Alternatively, the fibers are embedded in a polymeric material, such as resin or epoxy in a precured state, to form the tow 130. For example, the tow 130 may be a pre-impregnated carbon fiber tape. Accordingly, each tow 130 may include dry fibers, without preimpregnated resin, or impregnated fibers, with preimpregnated resin. The resin may be a thermoset or thermoplastic material. For example, the resin is a thermoplastic resin, such as a polyetheretherketone (PEEK) or polyetherketoneketone (PEKK) material in some implementations. In certain examples, the tows 130 have some degree of "tack" or stickiness. According to another example, the tow 130 is a 3-D printing material, such as filaments made of polyethylene terephthalate (PET), acrylonitrile butadiene styrene (ABS), polypropylene, polycarbonate, nylon, polylactic acid, and metal. In some examples, each tow 130 has a width of between 0.125 inches, inclusively, and 0.5 inches, inclusively. For example, each tow 130 may have a width of 0.125 inches, 0.25 inches, or 0.5 inches. In other examples, the tows 130 can have a width that is less than 0.125 inches or more than 0.5 inches.

The surface 141 is the surface of any of various objects 140 onto which the application of the tow 130 is advantageous. In one example, the object 140 is a die or mold and the surface 141 defines a shape of a part to be formed by the die or mold. Accordingly, in certain implementations, the tow 130 is a material tape that is laid up on the surface 141 to form a layer 142 of a part. For example, the surface 141 can be a layup or forming mandrel with a contour representative of an aerodynamic surface. In other examples, the object 140 is a part and the surface 141 is a surface of the part. Accordingly, in certain implementations, the tow 130 is applied directly onto the surface of a part to form a layer 142 of the part. In yet other examples, the object 140 is a previously applied layer of the tow 130, such that the surface 141 is the surface of the previously applied layer. Accordingly, in some implementations, multiple layers of the tow 130 are formed on top of each other, in a stacked arrangement, to form a laminated part. In one implementation, the tow 130 is a material tape that is applied on top of each other to form a part made of multiple layers of the material tape. In another implementation, the tow 130 is a 3-D printing material that is applied onto each other to form a part made of multiple layers of the 3-D printing material.

The end effector 110 includes an applicator 117 that is configured to apply the tows 130 onto the surface 141. Accordingly, the configuration of the applicator 117 is dependent on the material and shape of the tows 130. According to one example, each tow 130 includes material tape and the applicator 117 is a compaction roller. The compaction roller is rotatable about a roller axis to apply tows 130 onto the surface 141. The compaction roller compacts (e.g., compresses) the tows 130 against the surface 141, which facilitates deliverance of the tows 130 onto the surface 141. The robot 102 is operable to translationally move the end effector 110 in an application direction such that the applicator 117 moves along the surface 141 in the application direction. When the surface 141 is contoured, such as shown in FIG. 1, the robot 102 is configured to adjust the position (e.g., height and/or angle) of the applicator 117 to continue moving in the application direction along the contoured portion of the surface 141. Adjustment of the applicator 117 can be made by tilting or raising or lowering the end effector 110 using one or more articulating members of the robot 102.

The tows 130 are fed to the applicator 117 of the end effector 110 from the creel assembly 120. In certain examples, to help prevent interference (e.g., undesired contact) between the tows 130 and the robot 102 and end effector 110, as the tows 130 are fed to the applicator 117, the tows 130 are threaded through a tow standoff 118 co-movably fixed to the end effector 110. The tow standoff 118 includes apertures each receiving and retaining a corresponding one of the tows 130. Accordingly, the tow standoff 118 helps to separate the tows 130 from the robot 102 and the end effector 110, and from themselves, while the tows 130 are fed from the creel assembly 120 to the end effector 110.

Notwithstanding the tow standoff 118 at the end effector 110 helping to position the tows 130 away from the robot 102 and end effector 110, in some situations the tows 130 are still prone to contacting the robot 102 and the end effector 110. For example, the end effector 110 may require rapid and expansive movement relative to the robot 102 in order to apply the tows 130 onto the surface 141, particularly when applying the tows 130 onto surfaces 141 with small radii (e.g., as low as 5 inches or 2.5 inches). Depending on the direction of the movement, the expansive movement of the robot 102 may cause a significant loss in tension in the tows 130, which may result in the tows 130 drooping into contact with the robot 102 or the end effector 110 even when the tow standoff 118 is used.

In other situations, the rapid and expansive movement of the end effector 110 relative to the robot 102 in certain directions may cause overtensioning of the tows 130. Overtensioning the tows 130 can stretch the tows 130 beyond a desired amount, such as to the point of degrading the materials of the tows 130.

To help compensate for rapid and expansive movement of the end effector 110 relative to the robot 102, and to reduce undertensioning or overtensioning the tows 130 while the tows 130 are being applied onto the surface 141 by the end effector 110, the creel assembly 120 includes a tow tensioner 124. Generally, the tow tensioner 124 is configured to first rapidly mechanically compensate for undertensioning and overtensioning of the tows 130 and then actively further compensate for undertensioning and overtensioning of the tows 130 by sensing the tension state of the tows 130 and commanding unwinding of the tows 130 from corresponding spools 160 or winding of the tows 130 onto corresponding spools 160 as necessary. In certain examples, the tow tensioner 124 maintains tension in the tows 130 to within a desirable tension range. In one example, the tow tensioner 124 keeps a change of tension in the tows 130 to within +/−0.25 pound-force (lbf). According to yet another example, the tow tensioner 124 keeps a change of tension in the tows 130 to within +/−0.10 pound-force (lbf).

Figure 2:
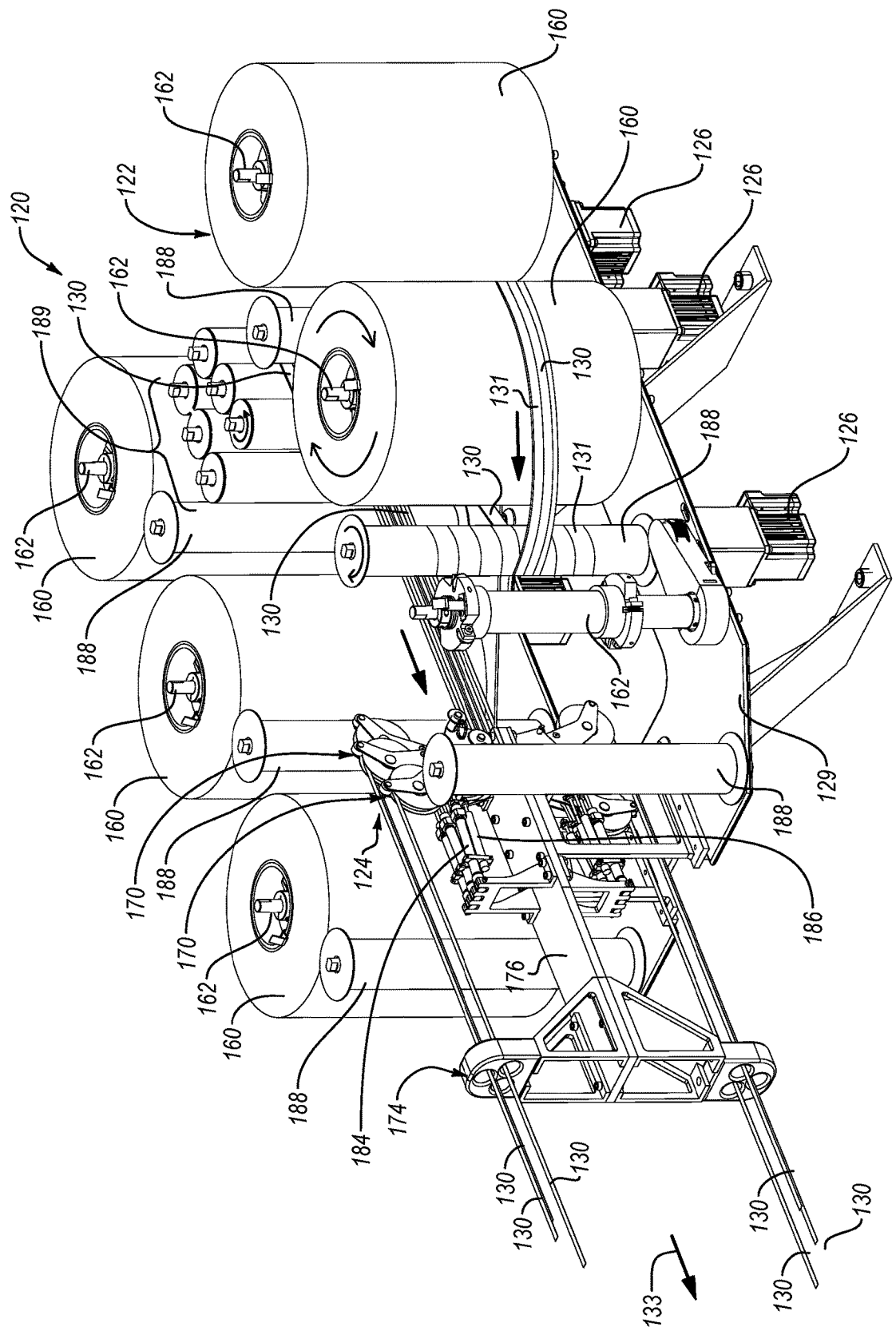
FIG. 2 is a perspective view of a creel assembly of an automated fiber placement system, according to one or more examples of the present disclosure.

Referring to FIG. 2, the tow tensioner 124 of the creel assembly 120 receives the tows 130 from corresponding spools 160 of the creel assembly 120. The spools 160 are mounted on a base 129 of the creel assembly 120. The base 129 is attached to the robot 102, such as the support arm 156 of the robot 102. Generally, the base 129 provides a platform on which the spools 160 and the tow tensioner can be supported. In one example, the base 129 is a rigid plate or series of plates. The creel assembly 120 may include one spool 160 or multiple spools 160 depending on a desired number of tows 130 to be applied onto the surface 141 at one time. In the illustrated example, the creel assembly 120 includes six spools 160, although one spool 160 is removed for ease in showing certain other aspects of the creel assembly 120.

Additionally, the creel assembly 120 includes backing-film spindles 188 and redirection spindles 189 in some examples. According to certain examples, each one of the tows 130 includes a backing film 131 or other surface on which the tow 130 is mounted before being spooled on a spool 160 in preparation for a part fabrication process. In FIG. 2, only one backing film 131 is shown in association with a given one of the spools 160 to avoid obscuring other aspects of the creel assembly 120. Accordingly, although only one backing film 131 and corresponding tow 130 is shown unwinding from just one of the spools 160, it is recognized that a separate backing film 131 and tow 130 are associated with each of the other spools 160, even though they are not shown being unwound from the spools 160. The backing film 131 helps to reduce sticking of the tow 130 onto itself when wound onto a spool 160. As the tows 130 are unwound from the spools 160, and before being received by the tow tensioner 124, the backing film 131, which is made of a polymer material (e.g., polyethylene) in some examples, is removed from the tows 130. The backing film 131 (e.g., the polyethylene material of the backing film 131) has a thickness between 1 mm and 4 mm, inclusive, in some examples.

Each one of the backing-film spindles 188 is configured to receive and passively wind the backing film 131 from a corresponding one of the tows 130 as the backing film 131 is removed from the tow 130. In other words, the backing film 131, after being separated from the tows 130 due to the constant tension on the tows 130, is passively wound onto a corresponding one of the back-film spindles 188. After the backing film 131 is removed from the tows 130, each one of the tows 130 is partially wound about a corresponding one of the redirection spindles 189 before being received by the tow tensioner 124. Accordingly, the redirection spindles 189 orientate the tows 130, while the tows 130 are in tension, from non-parallel orientations to parallel orientations in preparation to be received by the tow tensioner 124. In the case of rewinding a tow 130 back onto a spool 160, for increasing tension in the tow 130, the backing film 131, wound on the backing-film spindle 188, will become reapplied onto the tow 130 before the tow 130 is rewound onto the spool 160.

Each spool 160 includes a single and continuous tow 130 in a spooled or wound arrangement about a central rod or spindle 162 of the spool 160. Moreover, each spool 160 is co-rotatably coupled to a corresponding spindle 162. Accordingly, each spindle 162, and thus each spool 160, is rotatably coupled to the base 129 and rotates relative to the base 129 to allow the corresponding tow 130 to be unwound (e.g., released or paid out) from or wound (e.g., retracted or picked up) onto the spool 160. As the applicator 117 applies the tows 130 onto the surface 141, the corresponding tension in the tows 130 cause the tows 130 to passively unwind from the spools 160. In other words, the application of the tows 130 onto the surface 141, in effect, pulls the tows 130 off of the spools 160, which causes the spools 160 to passively rotate.

In some examples, the creel assembly 120 further includes motors 126, each operatively coupled to a corresponding one of the spools 160, to actively or forcibly rotate the spools 160 as needed to maintain a desirable tension in the tows 130. The motors 126 may be attached to the base 129 and coupled in rotatable engagement with corresponding ones of the spindles 162. The motors 126 are selectively and independently operable relative to each other such that active rotation of any one of the spindles 162 can be provided independently of active rotation of any other of the spindles 162. Each one of the motors 126 is bidirectional and thus capable of rotating a corresponding spindle 162 in either a first rotational direction or a second rotational direction, opposite the first rotational direction. Rotation of a spindle 162 in the first rotational direction corresponds with unwinding the tow 130 from the spool 160 that is co-rotatably coupled to the spindle 162. In contrast, rotation of a spindle 162 in the second rotational direction corresponds with winding the tow 130 onto the spool 160 that is co-rotatably coupled to the spindle 162. As shown in FIG. 1, the motors 126 are operably coupled with a controller 108 of the tow tensioner 124 to receive operational commands from the controller 108 and to operate in accordance with the operational commands. The operational commands can include rotational direction commands, rotational amount commands, and/or rotational speed commands.

As shown in FIG. 2, the tows 130 from the spools 160 are received by the tow tensioner 124 before extending in a tow direction 133 and reaching the end effector 110. The tow direction 133 is the direction of travel of the tow 130 as the tow 130 The tow tensioner 124 includes an arm assembly 170 for each one of the tows 130. In the illustrated examples, the creel assembly 120 includes six tows 130. Accordingly, in such examples, the tow tensioner 124 includes six arm assemblies 170. Each arm assembly 170 is translationally fixed to the base 126 and pivotably coupled with the base 126 such that the arm assembly 170 is pivotable toward and away from the tow direction 133. Moreover, each arm assembly 170 is pivotable between, and including, a forward position (see, e.g., FIG. 5) and a rearward position (see, e.g., FIG. 6). A distance between the forward position and the rearward position defines a range of motion (ROM) of each arm assembly 170. In some examples, the ROM of each arm assembly 170 is no more than 4 inches, no more than 3 inches, or no more than 2 inches. Each arm assembly 170 is positionable in a neutral position (see, e.g., FIG. 4) between the forward position and the rearward position. As explained below, the neutral position is associated with a targeted or desired tension of a tow 130.

Figure 3:
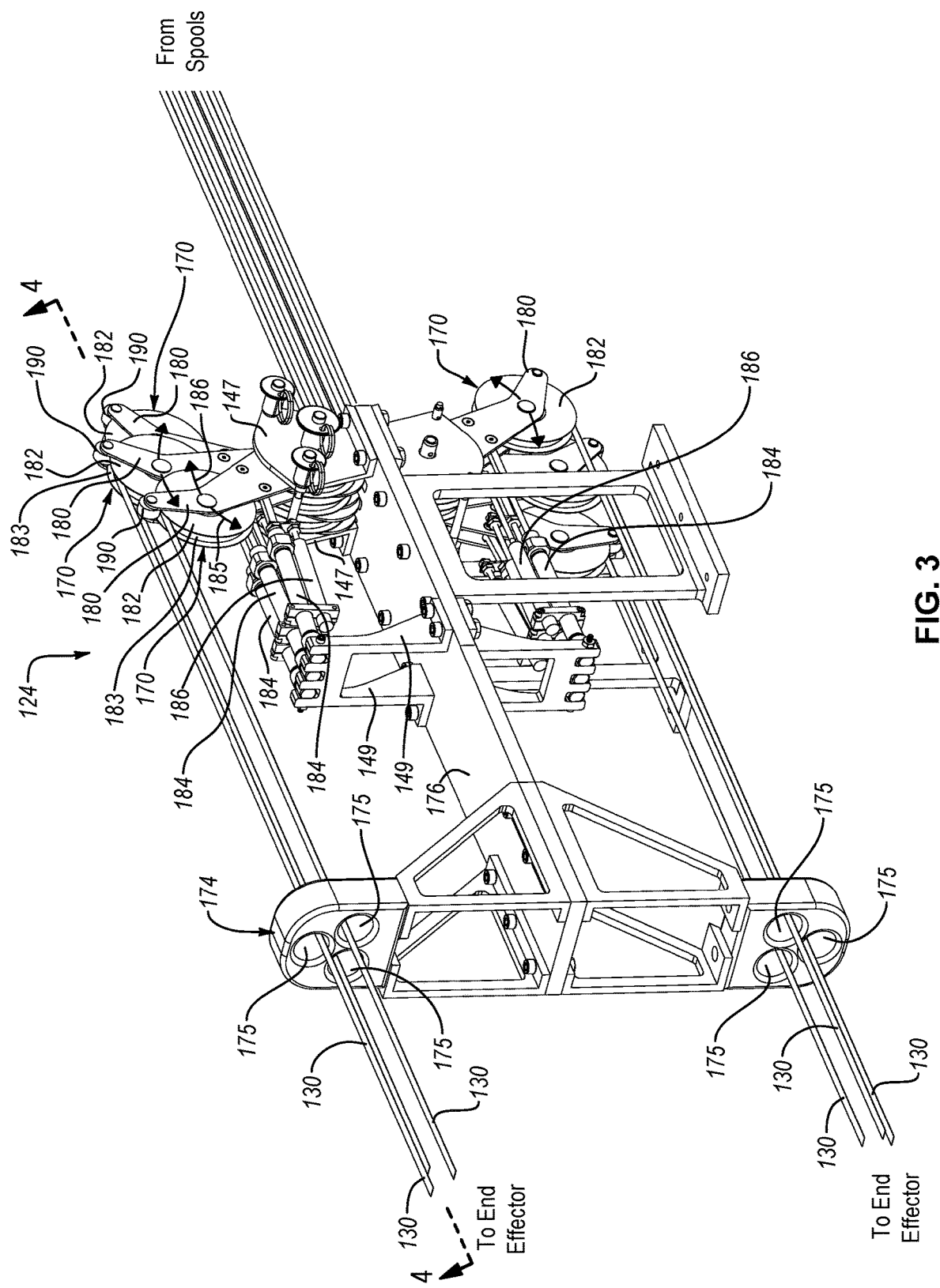
FIG. 3 is a perspective view of a tow tensioner of the creel assembly of FIG. 2, according to one or more examples of the present disclosure.

Each arm assembly 170 is configured to secure the tow 130 from a corresponding one of the spools 160 as the tow unwinds from the corresponding spool 160 and moves in the tow direction 133. Referring to FIG. 3, each arm assembly 170 includes an arm 180 and a wheel 182. The wheel 182 is rotatably coupled to the arm 180 such that the wheel 182 rotates about an axis that is fixed to the arm 180 and is perpendicular to the tow direction 133. Accordingly, the wheel 182 is rotatable within a plane that is parallel to the tow direction 133. The wheel 182 is located on a free end portion of the arm 180. The arm 180 is pivotable about an arm axis 167 (see, e.g., FIG. 4) that is fixed relative to the support arm 156 of the robot 102. The arm axis 167 is located at a fixed end portion of the arm 180, which is spaced apart from the free end portion of the arm 180. In this manner, the wheel 182 is pivotable about the arm axis 167 as the wheel 182 rotates relative to the arm 180. As shown in FIG. 3, the arm 180 and the wheel 182 are pivotable about the arm axis 167 in a forward direction 185 up to the forward position and in a rearward direction 186 up to the rearward position.

The wheel 182 includes a circumferential groove 183, extending about an outer periphery of the wheel 182, that receives and retains the tow 130 as the tow 130 moves in the tow direction 133. The circumferential groove 183 engages the tow 130 such that the wheel 182 moves with the tow 130. In other words, the wheel 182 rotates, in a first rotational direction, as the tow 130, engaged with the wheel 182, moves in the tow direction 133. Likewise, the wheel 182 rotates, in a second rotational direction opposite the first rotational direction, as the tow 130 engaged with the wheel 182 moves in a retraction direction opposite the tow direction 133, as will be explained below.

To help secure the tow 130 to the wheel 182 (e.g., retain the tow 130 in the circumferential groove 183 of the wheel 182), in some examples, each arm assembly 170 further includes a retention wheel 190 (see, e.g., FIG. 3). The retention wheel 190 is rotatably coupled to the free end of the arm 180 such that the retention wheel 190 rotates about an axis that is fixed to the arm 180 and is perpendicular to the tow direction 133. Accordingly, the retention wheel 190 is rotatable within a plane that is parallel to the tow direction 133. The retention wheel 190 is also rotatable relative to the wheel 182. A portion of the retention wheel 190 extends into the circumferential groove of the wheel 182 to trap the tow 130 against the circumferential groove 183 of the wheel 190 and keep the tow 130 in the circumferential groove.

Each arm assembly 170 also includes a secondary wheel 192 that is rotatably coupled relative to the arm 180 and rotates about the same axis as the arm 180. The secondary wheel 192 is coplanar or vertically aligned with the wheel 182 and helps to direct the tow 130 from a spool 160 to the wheel 182. More specifically, the secondary wheel 192 and the wheel 182 cause the tow 130 to move along an S-shaped flow path between the spool 160 and the end effector 110. Such a flow path shape helps to maintain tension in the tow 130.

In certain examples, the tow tensioner 124 further includes a base 176, which is fixed relative to the support arm 156 of the robot 102 such that the base 176 does not move relative to the support arm 156. The base 176 may be non-movably fixed to the base 129 of the creel assembly 120 via one or more brackets and fasteners. Likewise, the arm assemblies 170 may be rotatably coupled to the base 176 of the tow tensioner 124 via one or more brackets, fasteners, pins, and the like. In the illustrated example, the tow tensioner 124 includes a pair of first brackets 147 to which the arm assemblies 170 are rotatably coupled. The arm assemblies 170 may be positioned in a side-by-side manner between the pair of first brackets 147.

Referring to FIGS. 3-6, the tow tensioner 124 further includes a biasing member 184 coupled to the arm 180 of each one of the arm assemblies 170. Each biasing member 184 is configured to bias the corresponding arm assembly 170 away from the forward position toward the rearward position. More specifically, the biasing member 184 provides a bias such that when a tow 130 has a desirable tension, the arm assembly 170 is in the neutral position. In the illustrated examples, the biasing members 184 of the tow tensioner 124 are fixed to the base 176 via a pair of second brackets 149 and extend from the pair of second brackets 149 to the arm assemblies 170. The biasing members 184 are pivotably coupled to the pair of second brackets 149 at first end portions and pivotably coupled to the arm assemblies 170 at second end portions, opposite the first end portions.

More specifically, each biasing member 184 includes a first end portion that is pivotably coupled to the pair of second brackets 149 and includes a second end portion that is pivotably coupled to the arm 180 of a corresponding one of the arm assemblies 170.

Figure 5:
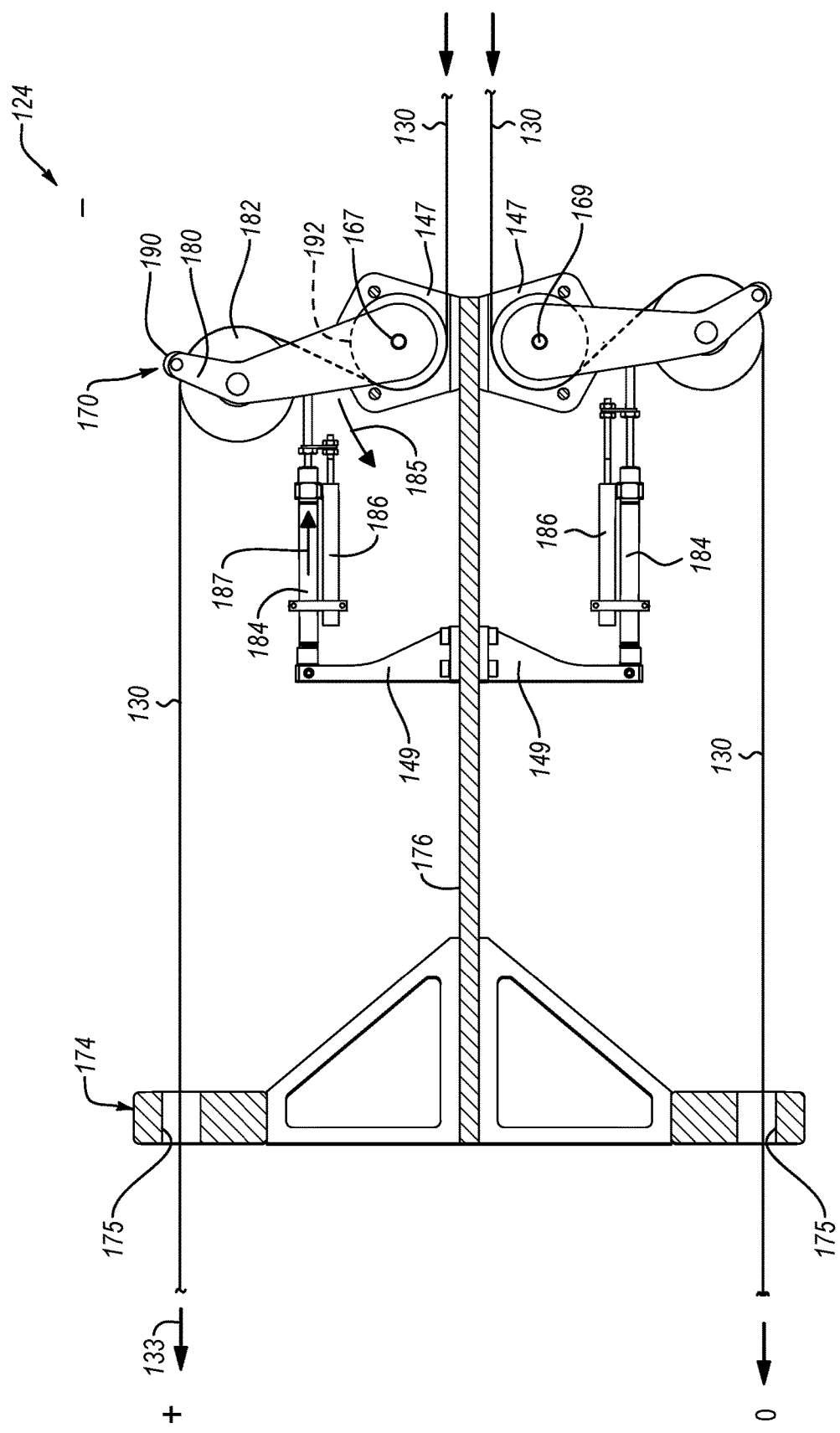
FIG. 5 is a cross-sectional side elevation view of the tow tensioner of FIG. 3, sectioned according to the line 4-4 of FIG. 3 and shown with an arm assembly in a forward position, according to one or more examples of the present disclosure.
Figure 6:
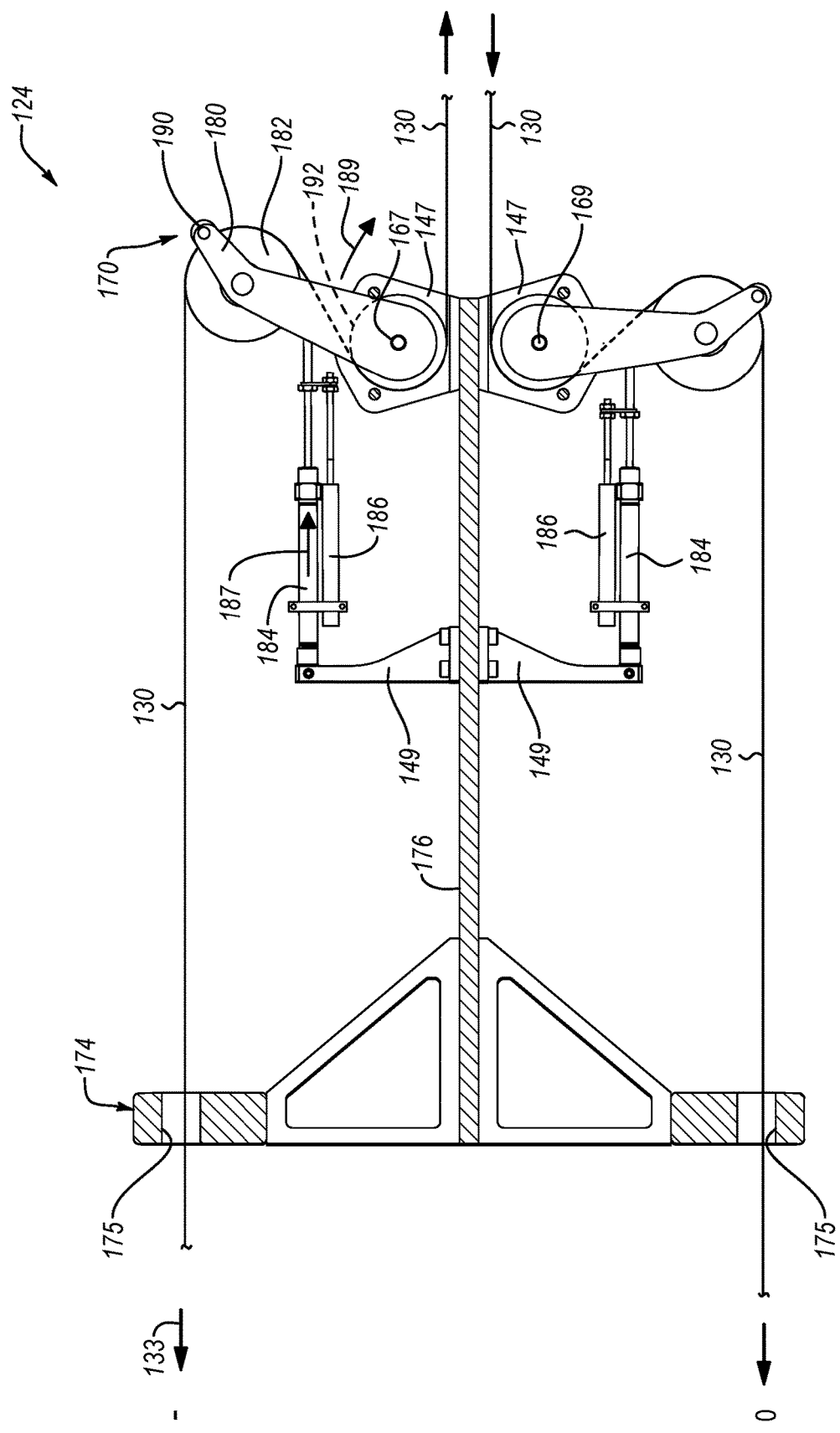
FIG. 6 is a cross-sectional side elevation view of the tow tensioner of FIG. 3, sectioned according to the line 4-4 of FIG. 3 and shown with an arm assembly in a rearward position, according to one or more examples of the present disclosure.

As the arm 180 of the corresponding arm assembly 170 pivots forward and rearward due to changes in the tension of the corresponding tow 130, the corresponding biasing member 184 pivots relative to the pair of second brackets 149 and the arm 180, as well as retracts and extends, respectively. Referring to FIG. 5, when the arm 180 is in a forward-of-neutral position (i.e., a position between the neutral position and the forward position, inclusive of the forward position), the corresponding biasing member 184 is in a retracted state and applies a biasing force 187 to the arm 180 to urge the arm 180 rearward toward the rearward position. Referring to FIG. 6, when the arm 180 is in a rearward-of-neutral position (i.e., a position between the neutral position and the rearward position, inclusive of the rearward position), the corresponding biasing member 184 is in a less-extended state, but still applies the biasing force 187 to urge the arm 180 rearward away from the neutral position. When in the forward-of-neutral position, the arm 180 moves rearwardly when the tension in the tow 130 decreases to level that is less than the biasing force 187. In contrast, when in the rearward-of-neutral position, the arm 180 moves forwardly when the tension in the two 130 increases to a level that is greater than the biasing force 187.

According to some examples, each biasing member 184 includes a mechanical spring, such as a compression spring, constant force spring, and the like. In yet other examples, each biasing member 184 is power-assisted actuator, such as a pneumatic piston damper actuator, that is selectively adjustable to adjust the biasing force of the biasing member 184. Use of a power-assisted actuator may be helpful for maintenance of the tow tensioner 124 and to compensate for changes to or adjustment of the tow tensioner 124, such as if the same system were used to apply a range of tows having different dimensions or properties. As mentioned above, the biasing force (e.g., the spring constant or the pneumatic pressure) of the biasing member 184 is selected such that, when a tow 130 is tensioned to a desirable tension, the arm assembly 170 is in the neutral position. In certain examples, the biasing force of the biasing member 184 is substantially equal to the desired tension.

Again referring to FIGS. 3-6, the tow tensioner 124 further includes a potentiometer 186 coupled to the arm 180 of each one of the arm assemblies 170. Each potentiometer 186 is configured to detect a position of the corresponding arm assembly 170. In the illustrated examples, the potentiometers 186 of the tow tensioner 124 are fixed to the base 176 via the pair of second brackets 149 and extend from the pair of second brackets 149 to the arm assemblies 170. The potentiometers 186 are pivotably coupled to the pair of second brackets 149 at first end portions and pivotably coupled to the arm assemblies 170 at second end portions, opposite the first end portions. More specifically, each potentiometer 186 includes a first end portion that is pivotably coupled to the pair of second brackets 149 and includes a second end portion that is pivotably coupled to the arm 180 of a corresponding one of the arm assemblies 170.

As the arm 180 of the corresponding arm assembly 170 pivots forward and rearward due to changes in the tension of the corresponding tow 130, the corresponding potentiometer 186 pivots relative to the pair of second brackets 149 and the arm 180, as well as retracts and extends, respectively. Referring to FIG. 5, when the arm 180 is in the forward-of-neutral position, the corresponding potentiometer 186 is in a retracted state and generates an arm-position input corresponding with a higher-than-neutral tension in the tow 130. In contrast, referring to FIG. 6, when the arm 180 is in the rearward-of-neutral position, the corresponding potentiometer 186 is in an extended state and generates an arm-position input corresponding with a lower-than-neutral tension in the tow 130. Alternatively, referring to FIG. 4, when the arm 180 is in the neutral position, the corresponding potentiometer 186 is in a non-extended or non-retracted state and generates an arm-position input corresponding with a neutral tension in the tow 130 (as indicated by the "0" in FIG. 4). The potentiometers 186 are communicatively coupled with the controller 108, such as via cables or wires, a Bluetooth or other wireless connection, and the like, to communicate the arm-position input to the controller 108. According to some examples, each potentiometer 186 is a linear potentiometer. In the illustrated examples, each potentiometer 186 is separate from the corresponding biasing member 184. However, in other examples, each potentiometer 186 is integrated with the corresponding biasing member 184.

Figure 4:
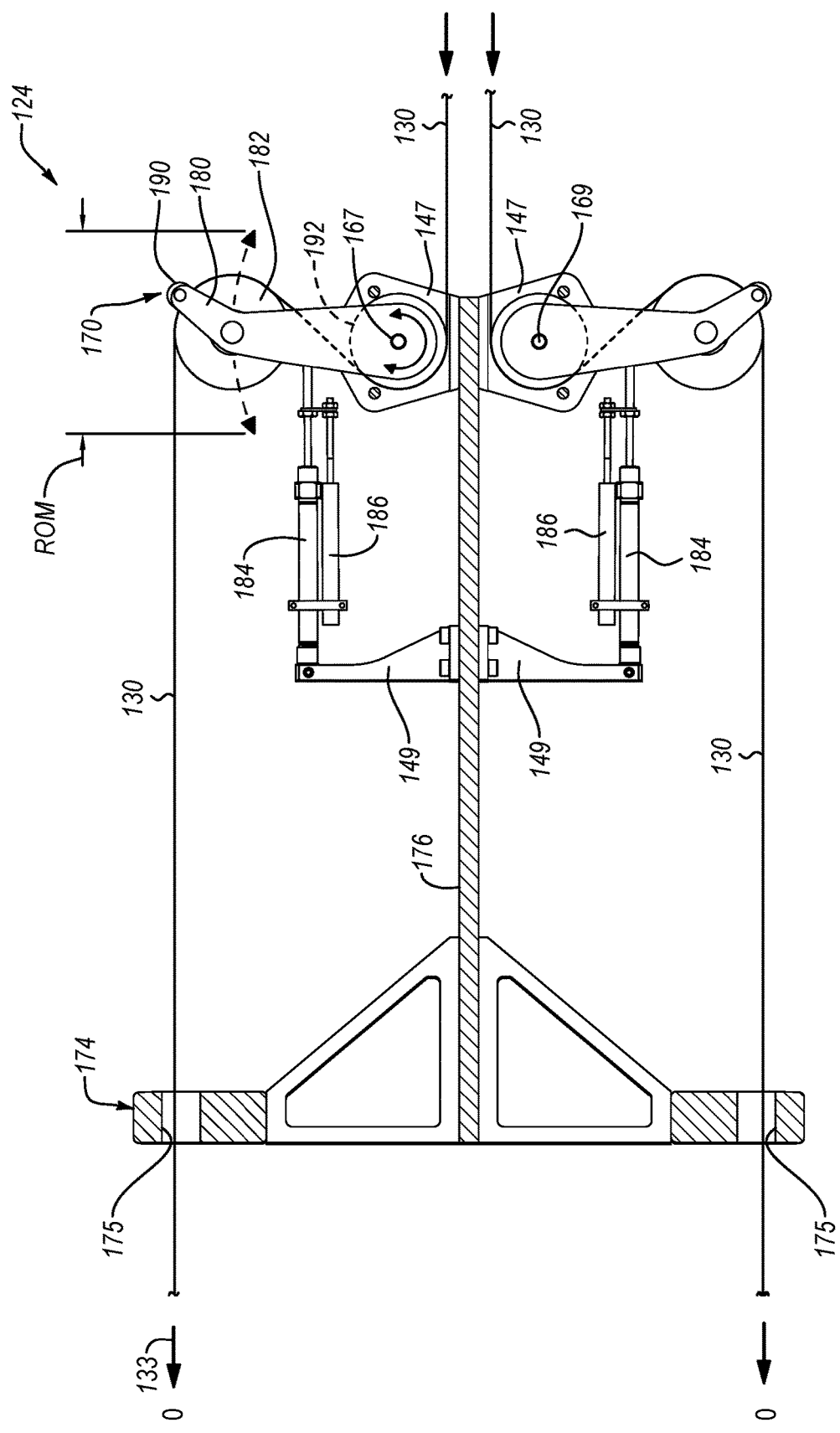
FIG. 4 is a cross-sectional side elevation view of the tow tensioner of FIG. 3, sectioned according to the line 4-4 of FIG. 3 and shown with an arm assembly in a neutral position, according to one or more examples of the present disclosure.

In some examples, the tow tensioner 124 includes a first set of arm assemblies 170 and a second set of arm assemblies 170. The first set of arm assemblies 170 mirror the second set of arm assemblies 170 across the base 176 of the tow tensioner 124. The base 176 includes a first side and a second side that is opposite the first side. As shown in FIG. 4, in these examples, the first set of arm assemblies 170 is fixed to the first side of the base 176 and the second set of arm assemblies 170 is fixed to the second side of the base 176. Accordingly, the second set of arm assemblies 170 mirrors the first set of arm assemblies 170. Mirroring or duplicating the arm assemblies 170 in this manner helps to increase the number of tows 130 accommodated by the tow tensioner 124 while limiting the footprint or form factor of the tow tensioner 124.

The arm assemblies 170 of the tow tensioner 124 are pivotable relative to each other. In other words, each arm assembly 170 of the arm assemblies 170 is pivotable relative to any other arm assembly 170 of the arm assemblies 170. Accordingly, each biasing member 184 of the biasing members 184 is extendable and retractable relative to any other of the biasing members 184 and each potentiometer 186 of the potentiometers 186 is extendable and retractable relative to any other of the potentiometers 186. In this manner, the tension in each one of the tows 130 is separately detected and accommodated for relative to any other of the tows 130.

In some examples, the tow tensioner 124 additionally includes a tow guide 174. As shown in FIGS. 2-6, the tow guide 174 is fixed to the base 176 of the tow tensioner 124 such that the tow guide 174 does not move relative to the base 176 as the tows 130 fed in the tow direction 133 or the retraction direction. The tow guide 174 is spaced apart from the arm assemblies 170 in the tow direction 133, by a length of the base 176, and receives the tows 130 from the arm assemblies 170. The tow guide 174 is configured to support the tows 130 and keep the tows 130 spaced apart from each other as the tows 130 move through the tow tensioner 124. In the illustrated examples, the tow guide 174 includes multiple tow apertures 175 spaced apart from each other. Each tow aperture 175 is configured to receive and retain a separate one of the tows 130. The tow apertures 175 are located away from the base 176 to help keep the tows 130 out of contact with the base 176. In the illustrated example, the automated fiber placement system 100 is configured to feed six tows 130 to the end effector 110. Accordingly, in the illustrated example, the tow guide 174 includes six tow apertures 175. From the tow guide 174, the tows 130 are fed to the end effector 110, such as the tow standoff 118 of the end effector 110.

In some examples, the arms 180, the redirection spindles 189, the wheels 182, the retention wheels 190, the secondary wheels 192, and the tow guide 174 are made of a material (e.g., fluorinated ethylene propylene (FEP), ultra-high-molecular-weight polyethylene (UHMW), and/or a metallic material (e.g., aluminum, steel, or brass)) that is configured to contact the tows 130, reduce sticking to the tows 130, and reduce contamination from the tows 130. In other words, the arms 180, the redirection spindles 189, the wheels 182, the retention wheels 190, the secondary wheels 192, and the tow guide 174 are made of a material that is contact-approved for use with resin-based preimpregnated materials or dry fiber materials. Other contact-approved materials include metal carbides, polytetrafluoroethylene (PTFE), rubber, titanium nitride, and metal/polymer composites.

Figure 7:
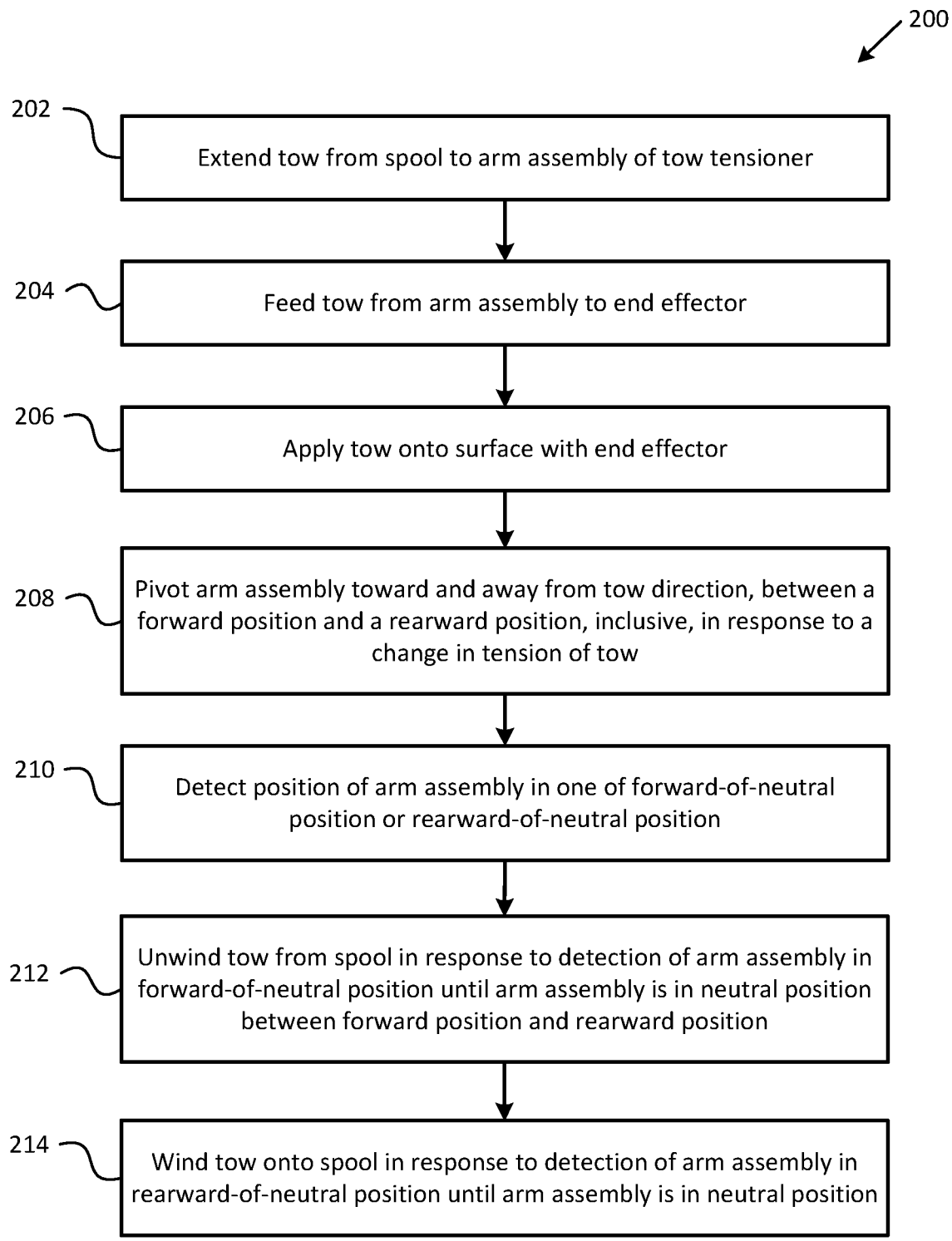
FIG. 7 is a schematic flow diagram of a method of delivering a material to a surface, according to one or more examples of the present disclosure.

Now referring to FIG. 7, according to some examples, a method 200 of delivering the tows 130 to the surface 141 is shown. The method 200 is performed using any one or more of the examples of the automated fiber placement system 100 disclosed herein. The method 200 includes (block 202) extending one or more tows 130 from one or more spools 160 to one or more arm assemblies 170 of the tow tensioner 124. Each one of the tows 130 is from a respective one of the spools 160 and extends to a respective one of the arm assemblies 170. The method 200 also includes (block 204) feeding the one or more tows 130 from the arm assembly 170 to the end effector 110 in the tow direction 133. The method 200 further includes (block 206) applying the one or more tows 130 onto the surface 141 with the end effector 110.

As the tows 130 are applied onto the surface 141, under some circumstances, the end effector 110 moves enough relative to the surface 141 and the robot 102 that tension in the one or more tows 130 changes. The automated fiber placement system 100 provides immediate compensation for initial changes in tension in the tows 130 as the end effector 110 applies the tows 130 to the surface 141. For example, the method 200 includes (block 208) pivoting an arm assembly 170 toward and away from (i.e., with or against) the tow direction 133, between a forward position and a rearward position, inclusive, in response to a change in tension of the tow 130. When tension of a tow 130 increases above a neutral tension, or has a positive tension as indicated by the "+" in FIG. 5, the added tension effectually pulls the arm assembly 170 forward in the tow direction 133 into a forward-of-neutral position, which compensates for the added tension by adding slack to the tow 130 and preventing further increases in tension. In contrast, when tension of a tow 130 decreases below the neutral tension, or has a negative tension as indicated by the "−" in FIG. 6, the reduced tension allows the arm assembly 170 to swing rearward in the tow retraction direction into a rearward-of-neutral position, which compensates for the drop in tension by reducing slack in the tow 130 and preventing further decreases in tension.

The method 200 further includes (block 210) detecting the positions of the arm assemblies 170 in one of the forward-of-neutral position or the rearward-of-neutral position. The positions of the arm assemblies 170 are detected by the potentiometers 186 with each potentiometer 186 detecting the position of a corresponding one of the arm assemblies 170. The potentiometers 186 generate arm-position inputs in response to the positions of the arm assemblies 170 detected by the potentiometers 186. The arm-position inputs are communicated to the controller 108 of the automated fiber placement system 100.

In response to the arm-position inputs received from the potentiometers 186, the controller 108 actuates the motors 126 to rotate the spools 160 as needed to control the tension in the tows 130 and maintain a change in tension in the tows 130 within a desirable range. More specifically, according to the method 200, if one or more corresponding arm assemblies 170 is in the forward-of-neutral position, as determined at block 211 of the method 200, then the controller 108 controls the motors 126 to facilitate (block 212) unwinding of one or more of the tows 130 from one or more corresponding spools 160 until the one or more arm assemblies 170 is in the neutral position. Unwinding of the spools 160 occurs as the motors 126 rotate the spools 160 in a second rotational direction. In some examples, the controller 108 rotates a corresponding one of the spools 160 in the second rotational direction an amount proportional to a distance between the detected forward-of-neutral position of the corresponding one of the arm assemblies 170 and the neutral position. Unwinding a tow 130 from a spool 160 decreases the tension in the tow 130, which causes the corresponding arm assembly 170 to move rearwardly.

In contrast, according to the method 200, if one or more corresponding arm assemblies 170 is in the rearward-of-neutral position, as determined at block 213 of the method 200, then the controller 108 controls the motors 126 to facilitate (block 214) winding or respooling of one or more of the tows 130 onto one or more corresponding spools 160 until the one or more arm assemblies 170 is in the neutral position. Winding of the spools 160 occurs as the motors 126 rotate the spools 160 in a first rotational direction, opposite the second rotational direction. In some examples, the controller 108 rotates a corresponding one of the spools 160 in the first rotational direction an amount proportional to a distance between the detected rearward-of-neutral position of the corresponding one of the arm assemblies 170 and the neutral position. Winding a tow 130 from a spool 160 increases the tension in the tow 130, which causes the corresponding arm assembly 170 to move forwardly. It is also recognized that according to the method 200, the controller 108 does not rotate the motors 126, such that no unwinding or winding occurs by virtue of the motors 126, in response to detection of one or more corresponding arm assemblies 170 being in the neutral position.

According to the method 200, the arm assemblies 170 pivot to provide immediate passive, but limited, adjustment to the tension in the tows 130 to avoid overtensioning or undertensioning the tows 130, which gives the controller 108 and the motors 126 time to unwind or wind the spools 160 to provide active and unlimited adjustment to the tension in the tows 130. In other words, the pivotable nature of the arm assemblies 170 provides short-term tension relief and the active control of the winding and unwinding of the spools 160 provides more long-term tension relief.

As described above, the arm assemblies 170, the biasing members 184, the potentiometers 186, the motors 126, and the spools 160 of the automated fiber placement system 100 are each independently actuatable to provide tension adjustments to any one or more tows 130 independently of any one or more other tows 130. Accordingly, the method 200 can be practiced to actuate any one or more of the arm assemblies 170, the biasing members 184, the potentiometers 186, the motors 126, and the spools 160 independently of any other one or more of the arm assemblies 170, the biasing members 184, the potentiometers 186, the motors 126, and the spools 160 to adjust tension in any one or more tows 130 relative to any other one or more tows 130.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An automated fiber placement system for forming a part, comprising:
   a robot;
   an end effector, coupled to the robot such that the end effector is movable relative to the robot;
   a creel assembly, coupled to the robot and movable with the robot, wherein the creel assembly comprises:
      a spool of a tow;
      a tow tensioner, comprising:
         an arm assembly, pivotable toward and away from a tow direction between, and inclusive of, a forward position and a rearward position, and configured to secure the tow from the spool as the tow unwinds from the spool and moves in the tow direction;
         a biasing member, coupled to the arm assembly and configured to bias the arm assembly into a neutral position between the forward position and the rearward position; and
         a potentiometer, coupled to the arm assembly and configured to detect a position of the arm assembly; and
         a motor, coupled to the spool and selectively operable to rotate the spool in a first rotational direction, when the position of the arm assembly is in a first position, different than the neutral position, to rotate the spool in a second rotational direction, which is opposite the first rotational direction, when the position of the arm assembly is in a second position, which is different than the first position and the neutral position, and to not rotate the spool, when the position of the arm assembly is in the neutral position.

2. The automated fiber placement system according to claim 1, wherein
rotation of the spool in the first rotational direction unwinds the tow from the spool, and rotation of the spool in the second rotational direction winds the tow onto the spool.

3. The automated fiber placement system according to claim 2, wherein:
the tow tensioner further comprises a controller, coupled to the potentiometer to receive an arm-position input from the potentiometer and coupled to the motor to control rotation of the spool in either the first rotational direction or the second rotational direction in response to the arm-position input;
the arm-position input from the potentiometer indicates the arm assembly is in one of the second position, which is a forward-of-neutral position, the neutral position, or the first position, which is a rearward-of-neutral position; and
the controller controls rotation of the spool by:
rotating the spool in the second rotational direction, via operation of the motor, when the arm-position input indicates the arm assembly is in the forward-of-neutral position;
rotating the spool in the first rotational direction, via operation of the motor, when the arm-position input indicates the arm assembly is in the rearward-of-neutral position; and
not rotating the spool when the arm-position input indicates the arm assembly is in the neutral position.

4. The automated fiber placement system according to claim 3, wherein:
the controller rotates the spool in the second rotational direction an amount proportional to a distance between the forward-of-neutral position and the neutral position; and
the controller rotates the spool in the first rotational direction an amount proportional to a distance between the rearward-of-neutral position and the neutral position.

5. The automated fiber placement system according to claim 3, wherein the controller controls rotation of the spool to maintain a change of tension in the tow to within +/−0.25 pound-force (lbf).

6. The automated fiber placement system according to claim 5, wherein the controller controls rotation of the spool to maintain a change in tension in the tow to within +/−0.10 pound-force (lbf).

7. The automated fiber placement system according to claim 2, wherein:
the creel assembly further comprises:
a plurality of tows;
a plurality of spools, each comprising a corresponding tow of the plurality of tows; and
a plurality of motors, each coupled to a corresponding spool of the plurality of spools and each selectively operable to rotate the corresponding spool in the first rotational direction, to unwind the corresponding tow of the plurality of tows from the corresponding spool, and the second rotational direction, to wind the corresponding tow onto the corresponding spool; and
the tow tensioner further comprises:
a plurality of arm assemblies, each independently pivotable relative to any other arm assembly of the plurality of arm assemblies and each configured to secure a corresponding tow of the plurality of tows as the corresponding tow moves in the tow direction;
a plurality of biasing members, each coupled to a corresponding arm assembly of the plurality of arm assemblies; and
a plurality of potentiometers, each coupled to a corresponding arm assembly of the plurality of arm assemblies;
wherein:
the controller is coupled to the plurality of potentiometers to receive arm-position input from each of the plurality of potentiometers;
the controller is coupled to the plurality of motors to control rotation of each one of the plurality of spools independently of any other one of the plurality of spools; and
the controller controls rotation of a corresponding spool of the plurality of spools in either the first rotational direction or the second rotational direction in response to the arm-position input received from the potentiometer of the plurality of potentiometers coupled to the arm assembly to which the tow of the corresponding spool is secured.

8. The automated fiber placement system according to claim 1, wherein the biasing member is selectively adjustable to adjust a bias of the biasing member.

9. The automated fiber placement system according to claim 1, wherein:
the arm assembly comprises an arm, pivotable toward and away from the tow direction between, and inclusive of, the forward position and the rearward position;
the arm assembly further comprises a wheel, rotatably coupled to the arm; and
the wheel comprises a circumferential groove, extending about an outer periphery of the wheel and configured to receive and retain the tow as the tow moves in the tow direction.

10. The automated fiber placement system according to claim 1, wherein the tow tensioner further comprises:
a base; and
a tow guide, fixed to the base and comprising a tow aperture configured to receive and retain the tow as the tow moves in the tow direction away from the arm assembly;
wherein:
the spool is movably fixed to the base;
the tow tensioner is movably fixed to the base;
the tow tensioner is interposed between the spool and the tow guide; and
the tow guide is spaced apart from the tow tensioner in the tow direction.

11. The automated fiber placement system according to claim 1, wherein:
the robot comprises a support arm, pivotable relative to the part;
the end effector is pivotable and rotatable relative to the support arm; and
the creel assembly is fixed to the support arm of the robot.

12. A method of using the automated fiber placement system of claim 1 for delivering a material to a surface, the method comprising steps of:
extending the tow from the spool to the arm assembly of the tow tensioner;
feeding the tow from the arm assembly to the end effector in the tow direction;
applying the tow onto the surface with the end effector;

pivoting the arm assembly toward and away from the tow direction, between, and inclusive of, the forward position and the rearward position, in response to a change in tension of the tow;

detecting the position of the arm assembly, using the potentiometer of the tow tensioner, in one of the second position or the first position;

unwinding the tow from the spool in response to detection of the arm assembly in the first position until the arm assembly is in the neutral position, between the forward position and the rearward position; and winding the tow onto the spool in response to detection of the arm assembly in the second position until the arm assembly is in the neutral position.

13. The method according to claim 12, further comprising biasing the arm assembly away from the forward position toward the rearward position.

14. The method according to claim 12, wherein the tow is unwound from the spool and the tow is wound onto the spool to maintain the change of tension in the tow to within +/−0.25 pound-force (lbf).

15. The method according to claim 12, further comprising retaining the tow within a circumferential groove of a wheel of the arm assembly as the arm assembly pivots toward and away from the tow direction.

16. The method according to claim 12, further comprising:

extending tows each to a corresponding arm assembly of a plurality of arm assemblies;

feeding each one of the tows from the corresponding arm assembly to the end effector in the tow direction;

applying the tows onto the surface with the end effector;

pivoting any arm assembly of the arm assemblies, independently of any other arm assembly of the arm assemblies, toward and away from the tow direction, between the forward position and the rearward position, inclusive, in response to a change in tension of the tow corresponding with the any arm assembly;

detecting the position of the arm assemblies in one of the second position or the first position;

unwinding any tow of the tows from a corresponding spool of the spools, independently of any other tow of the tows, in response to detection of the arm assembly, corresponding with the any tow, in the second position until the arm assembly, corresponding with the any tow, is in the neutral position; and winding any tow of the tows onto a corresponding spool of the spools, independently of any other tow of the tows, in response to detection of the arm assembly, corresponding with the any tow, in the first position until the arm assembly, corresponding with the any tow, is in the neutral position.

17. A tow tensioner for a creel assembly of an automated fiber placement system, the tow tensioner comprising:

an arm assembly, pivotable toward and away from a tow direction between, and inclusive of, a forward position and a rearward position, and configured to secure a tow as the tow moves in the tow direction;

a biasing member, coupled to the arm assembly and configured to bias the arm assembly into a neutral position between the forward position and the rearward position;

a potentiometer, coupled to the arm assembly and configured to detect a position of the arm assembly; and a motor, coupled to the spool and selectively operable to rotate the spool in a first rotational direction, when the position of the arm assembly is in a first position, different than the neutral position, to rotate the spool in a second rotational direction, which is opposite the first rotational direction, when the position of the arm assembly is in a second position, which is different than the first position and the neutral position, and to not rotate the spool, when the position of the arm assembly is in the neutral position.

18. The tow tensioner according to claim 17, further comprising:

a plurality of arm assemblies, each independently pivotable relative to any other arm assembly of the plurality of arm assemblies and each configured to secure a corresponding tow of a plurality of tows as the corresponding tow moves in the tow direction;

a plurality of biasing members, each coupled to a corresponding arm assembly of the plurality of arm assemblies; and a plurality of potentiometers, each coupled to a corresponding arm assembly of the plurality of arm assemblies.

19. The tow tensioner according to claim 18, further comprising a base having a first side and a second side, opposite the first side, wherein:

the plurality of arm assemblies are pivotably coupled to the base;

the plurality of arm assemblies comprise a first set of arm assemblies, pivotable about a first axis, and a second set of arm assemblies, pivotable about a second axis;

the first set of arm assemblies are fixed to the first side of the base; and the second set of arm assemblies are fixed to the second side of the base and mirror the first set of arm assemblies.

20. The tow tensioner according to claim 17, further comprising a tow guide, spaced apart from the arm assembly and comprising a tow aperture configured to receive and retain the tow as the tow moves in the tow direction away from the arm assembly.

* * * * *